G. KAMMERER.
APPARATUS FOR DETERMINING POINTS IN SPACE BY MEANS OF PERSPECTIVE VIEWS.
APPLICATION FILED MAY 21, 1914.

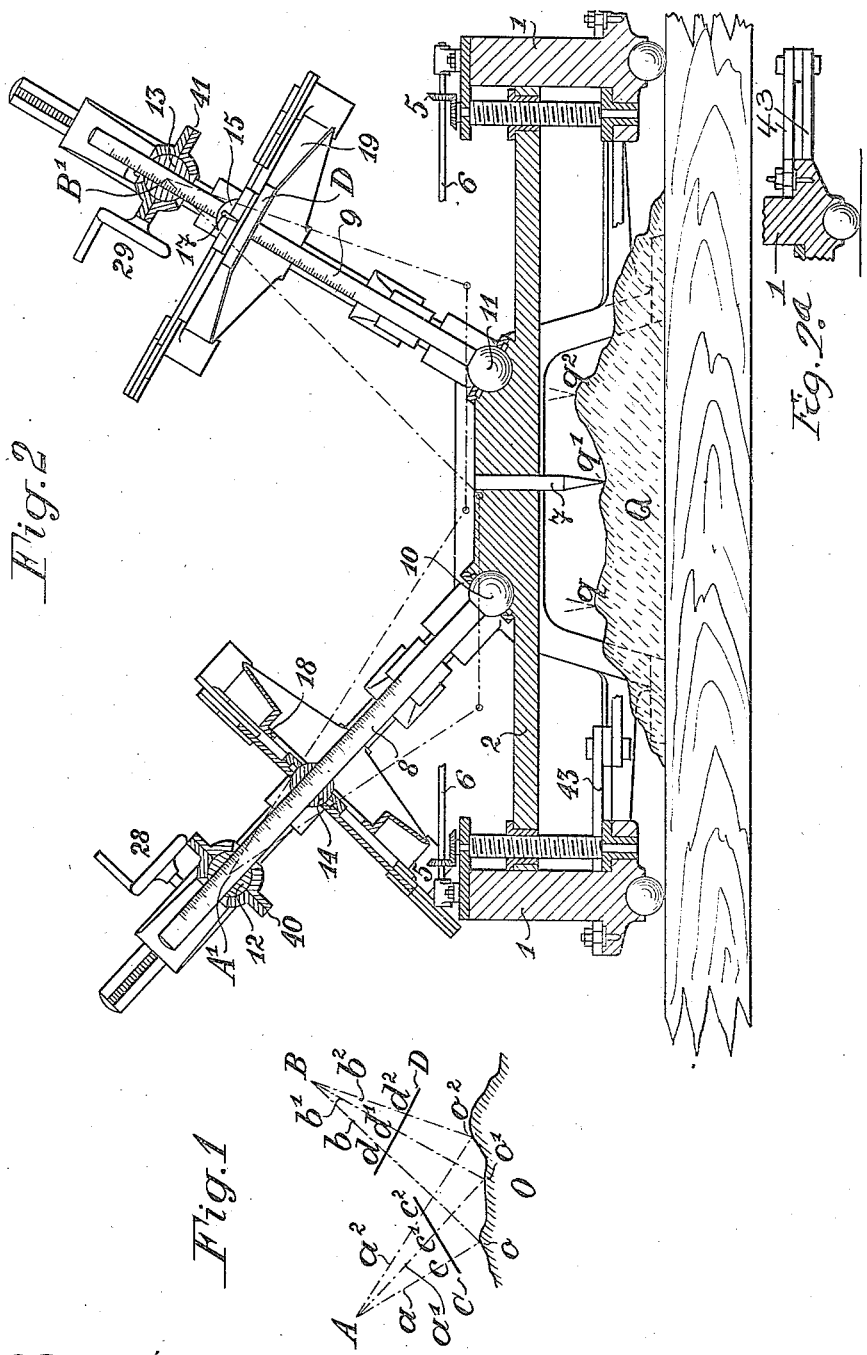

1,216,133. Patented Feb. 13, 1917.
3 SHEETS—SHEET 2.

Witnesses:

Inventor
Gustav Kammerer
by
James L. Norris,
Attorney.

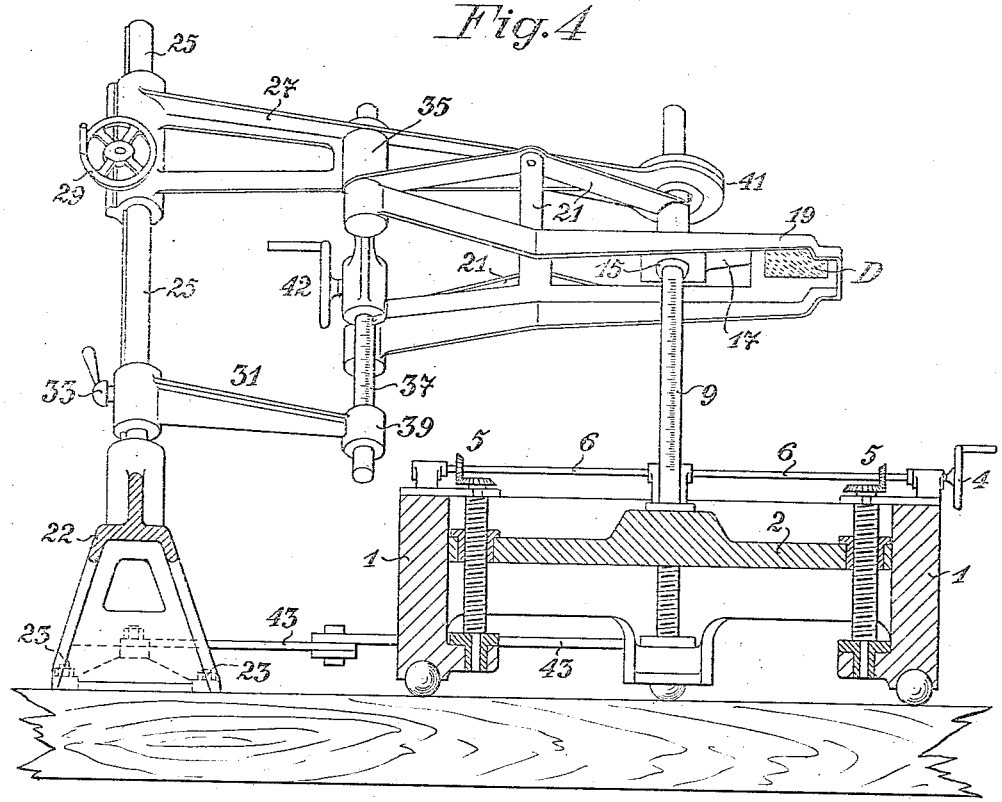

UNITED STATES PATENT OFFICE.

GUSTAV KAMMERER, OF VIENNA, AUSTRIA-HUNGARY.

APPARATUS FOR DETERMINING POINTS IN SPACE BY MEANS OF PERSPECTIVE VIEWS.

1,216,133.     Specification of Letters Patent.     Patented Feb. 13, 1917.

Application filed May 21, 1914. Serial No. 840,068.

*To all whom it may concern:*

Be it known that I, GUSTAV KAMMERER, subject of the Emperor of Austria-Hungary, residing at Vienna, Austria-Hungary, have invented certain new and useful Improvements in Apparatus for Determining Points in Space by Means of Perspective Views, of which the following is a specification.

This invention relates to apparatus for determining the position of points in space by means of perspective views for the production, for example, of relief, contour, or profile maps from two or more photographic views of a tract of country.

Apparatus according to this invention is based on the following scientific principle:

When two or more perspective views of an object taken from different positions or centers of projection are so arranged relatively to each other in space that the projection rays passing through identical points of the pictures will intersect one another at a common point, then the aggregate of these points of intersection will constitute an accurate model of the object, and the size of this model will depend upon the distances at which the centers of projection and the images or perspective views appertaining thereto are located from the said model.

In Figure 1 of the accompanying illustrative drawings, A and B denote the two projection centers or points of view; $a$, $a^1$, $a^2$, $b$, $b^1$, $b^2$ a number of rays emanating from the projection centers; O the object in relief such, for example, as a tract of country which is taken on a reduced scale from the two points of view A and B. C, D, denote the views obtained by photography; $o$, $o^1$, $o^2$ are points on the object which also constitute points of intersection of the projection rays proceeding from A and B, and $c$, $d$, $c^1$, $d^1$, $c^2$, $d^2$ represent the identical points of the two views C, D, these points on the image being the points in which the corresponding projection rays pass the respective picture planes.

According to this invention, the aforesaid principle may be practically applied to the production of a relief representation or model of any object, of which two or more perspective views have been taken from different points of view. This is effected in the following way: Two or more projection rays corresponding to identical points in the perspective views are represented by links which, as they cannot actually pass through the images, are arranged clear of the views or images and parallel to the projection rays corresponding to them, the said links being connected to pointers or gages which by displacement of the links are adapted to register with the identical points on the images. Under this assumption such parallel movements of the links (or it may be of the images) in space are obviously permissible.

Figs. 2 and 2ª of the drawings together show a constructional form of the apparatus in section according to the line I—II in Fig. 3.

Fig. 4 shows a section of the same according to the line III—IV in Fig. 3.

Fig. 5 represents a detail view of the apparatus partly in section.

Figure 3:
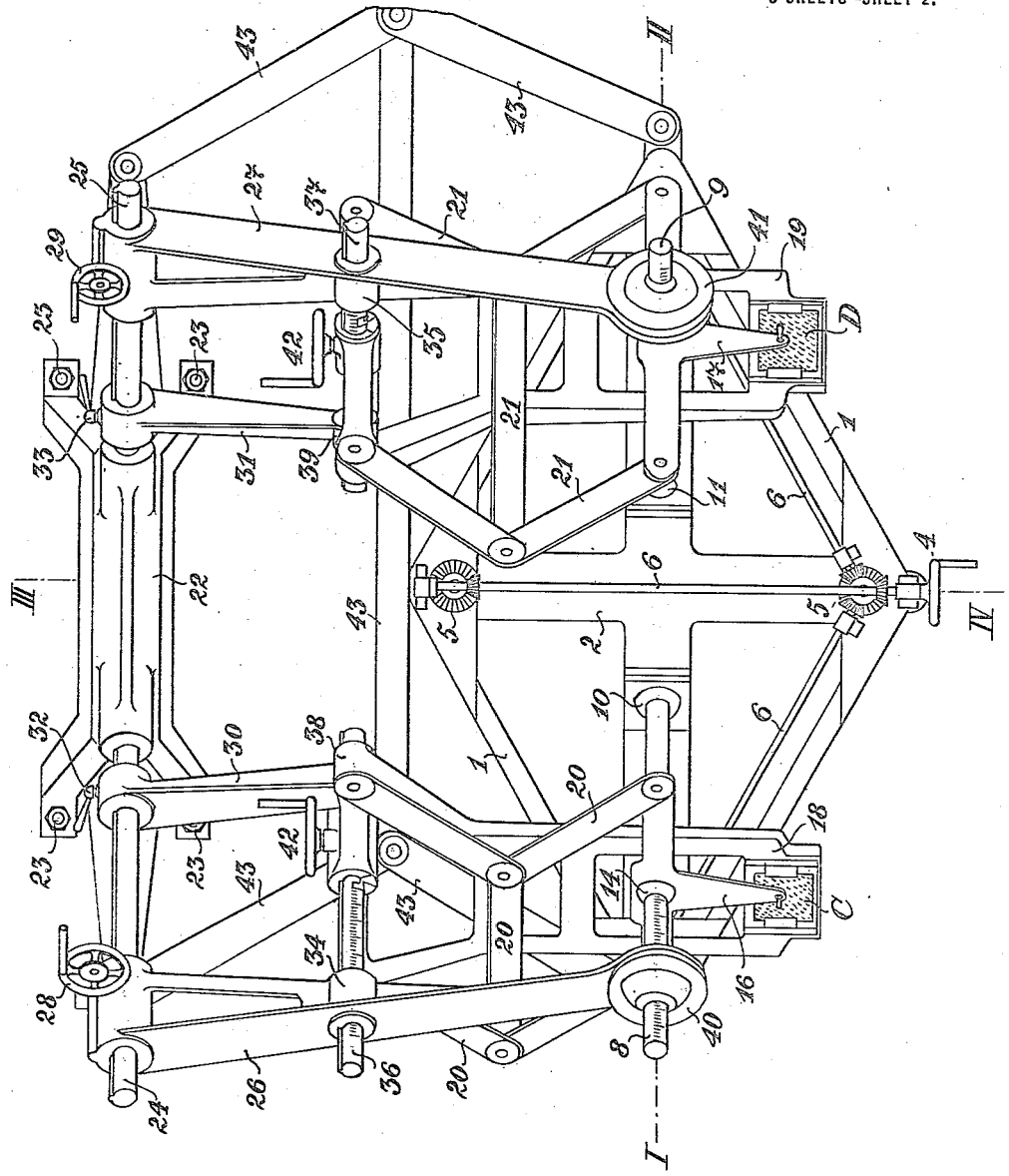
Fig. 3 shows a top view.

Referring to these drawings, a standard 22, (Figs. 3 and 4) adapted to be fixed by means of screws 23 to a table together with the guide bars 24 and 25 constitutes the stationary, immovable part of the apparatus. The bars 24, 25 serve to guide the arms 26, 27 which are capable of being adjusted in any altitudinal position desired by means of a hand wheel 28, 29. The said bars 24, 25, moreover, serve to guide the arms 30, 31 which are fixed to them by the aid of the screws 32, 33. To the arms 26, 27 there are attached bearings 34, 35, for receiving the guide bars 36, 37, each of these latter being provided with a scale. The other end of the guide bars 36, 37 passes through bearings 38, 39 carried by the arms 30, 31.

The two arms 26, 27 carry at their end portions bearings 40, 41 adapted to receive balls 12, 13, (Fig. 2). These balls represent the two projection centers A and B shown in Fig. 1. In view of the fact that the parts of the apparatus so far described are capable of being rigidly connected or clamped one to the other, the said two balls 12, 13 constitute fixed points. These balls are, moreover, mounted to rotate in their bearings, and their purpose is to receive the links 8 and 9, and this in such a manner that the links 8 and 9 pass through and at the same time are movable therein. These said links represent the projection rays $a$ and $b$ and are fixed to move at their ends on the bar 2 by means of the ball and socket joints 10, 11. Between the points 12, 10 and 13, 11 there are shiftably mounted upon the links spherical sleeves 14, 15 for the gages or pointers 16, 17 moving thereon, each of which is adjustable in a plane parallel with the corresponding image C or D and with the base plates 18, 19 carrying it. The base plates 18, 19 are adjustable along guide bars 36, 37 or in any kind of universal suspensions relatively to the fixed link bearings 40, 41 at any distance desired and by means of any kind of adjusting mechanism, for example, a rack and pinion 42. According to requirement, the picture slides or carriages are adapted to move on the said base plates 18, 19 and the images C and D upon the slides or carriages. Under special conditions, as when, for example, it is desired to evaluate perspective views, the distance of which from the center of projection is constant, or when perspective views are projected on parallel planes, or it may be, upon one and the same plane, this will, of course, tend to materially simplify the arrangement.

The pointers or gages 16, 17 guided by the spherical sleeves 14, 15 are linked to parallel guides 20, 21 of the known kind, whereby the former are unable to rotate when they are moved along their paths. The said parallel guides are connected to guide bars 36, 37.

The bar 2 carrying the drawing or modeling pin 7 is arranged in a frame 1 movable along in a horizontal direction. The vertical displacement of the said bar is effected for the purpose of enabling all its points to be moved on a line exactly parallel therewith by means of a rotatable handle 4 by aid of a bevel wheel gear 5 and shaft 6 in the known manner. In order to prevent any rotation of the bar 2 when the frame 1 is moved, the latter is linked by means of parallel guides 43 to the standard 22.

If, by way of example, the apparatus under notice is to serve for the production of a model Q (Fig. 2) having twice the size of the object O (Fig. 1), then, primarily, the two images C and D are so adjusted upon the base plates 18, 19 that their relative position assumed while the view was taken will be maintained with reference to the centers of projection A', B', (Fig. 2). This adjustment is effected by shifting the slides or carriages carrying the images as also by rotating and displacing the latter. While this is being done, the base plates must be shifted in parallel with the images C and D. Hereupon, the links 8, 9 are adjusted in a line parallel to rays passing through identical points in the images, for example, parallel to the rays $a'$, $b'$, (Fig. 1) appertaining to the point $o'$ on the object.

By moving the links 8, 9 within the balls 12, 13, and by raising or lowering the bar 2 by aid of the hand wheels 28, 29, the two fixed points A' and B' are removed from the guiding points 10, 11 for a distance which is twice as large as the distance of the point $o'$ on the object from the center of projection A and the center of projection B. The said distances are easily determinable from the images on hand, their inclination toward each other, and their centers of projection. The adjustment of the links 8, 9 parallel with the rays $a'$, $b'$ is effected by means of scales on which the relative lengths of all points of engagement of the links may be read off, thus for example, on scales along the links for the measurement of the particular length at a given time of the radius vector and on scales on the slides or carriages for the movements of the adjustable link bars.

The balls 14, 15, to which the pointers or gages 16, 17 are movably articulated, are adjusted by the fixed points A', B' for the like distance as the identical points $c'$, $d'$ of the images are removed from the projection centers A, B of their rays, the base plates having been previously moved in a position parallel with the images C, D. Now, whenever the frame 1 is moved upward about the bar 2 serving as a carrier for the drawing or modeling pin by the aid of the handle 4, and in such a manner that the adjusting gages 16, 17 are simultaneously brought over the identical points $c$, $d$ on the image, then the drawing or modeling pin 7 follows up at the same time the points $q$, $q'$, $q^2$ on the model corresponding to the relative points $o$, $o'$, $o^2$ on the object or the points $c$, $d$, $c'$, $d'$ on the image.

When a sufficient number of such points on the model have been determined, say, as points at the same height in contour lines, or as points of the same profile in profile lines which lie in planes parallel with each other, which may be effected by the suitable selection of identical points on the image and by shifting the frame 1 in a horizontal direction or of the drawing or modeling pin 7 in a vertical direction, then the relief thereby determined may be worked out in plastic material to correspond exactly to the object and on the scale desired, in the present example accordingly twice the natural size. By lengthening or shortening the distance of the spherical sleeves 14, 15 for the pointers and of the points of engagement 10, 11 from the projection centers A', B', or from the fixed points corresponding thereto, a proportionate enlargement or reduction of the relief is obtainable, whereas by displacing the fixed points relatively to the image, a distortion in an oblique direction will be produced.

The arrangement may be materially simplified if the images lie parallel with each other or in the same plane and the more so when they are also equidistant from their projection centers.

I claim as my invention:

Apparatus for determining points in space from perspective images thereof comprising supports for the images, at least two links or guide bars, means for supporting such links or guide bars whereby each is movable about a point in space, said links representing projection rays of identical points on the images, a drawing or modeling pin, a frame connecting said pin to the links, pointers or gages carried by the said links, and parallel motion means guiding said pointers or gages and connecting them to the drawing or modeling pin whereby setting of said pointers at identical points on the images adjusts said drawing or modeling pin to the corresponding point on the model.

In testimony whereof I have hereunto set my hand in presence of two subscribing witnesses.

GUSTAV KAMMERER.

Witnesses:
 LEO BERGHOLZ,
 Dr. W. BOTZOLL.